United States Patent
Huettner et al.

(10) Patent No.: US 8,665,426 B2
(45) Date of Patent: Mar. 4, 2014

(54) OPTICAL THREAD POSITION DETECTION DEVICE

(75) Inventors: Gerald Huettner, Vilseck (DE); Stefan Piana, Koefering (DE); Robert Schmitt, Schierling (DE); Ulrich Lappe, Regensburg (DE); Gerhard Fischer, Regensburg (DE)

(73) Assignee: Krones AG (DE)

( * ) Notice: Subject to any disclaimer, the term of this patent is extended or adjusted under 35 U.S.C. 154(b) by 216 days.

(21) Appl. No.: 13/269,376

(22) Filed: Oct. 7, 2011

(65) Prior Publication Data

US 2012/0086143 A1 Apr. 12, 2012

(30) Foreign Application Priority Data

Oct. 7, 2010 (DE) .................. 10 2010 047 618

(51) Int. Cl.
*G01B 11/26* (2006.01)
(52) U.S. Cl.
USPC .................................................. 356/139.04
(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 4,758,084 | A | | 7/1988 | Tokumi et al. ................. 356/237 |
| 5,126,556 | A | * | 6/1992 | Domenico et al. ......... 250/223 B |
| 5,591,462 | A | | 1/1997 | Darling et al. ................ 425/173 |
| 5,844,677 | A | | 12/1998 | Dimmick et al. ............. 356/240 |
| 5,900,945 | A | | 5/1999 | Hinata et al. .................. 356/428 |
| 2006/0045324 | A1 | | 3/2006 | Katayama et al. ............ 382/142 |
| 2010/0110448 | A1 | * | 5/2010 | Johnson ........................ 356/601 |
| 2010/0141756 | A1 | | 6/2010 | Grote et al. ................... 348/127 |

FOREIGN PATENT DOCUMENTS

| DE | 19540545 | 5/1997 | ................. B67B 3/26 |
| DE | 19914028 | 9/2000 | ............. G01N 21/90 |
| DE | 10 2007 025 524 | 12/2008 | ............. G01B 11/24 |
| EP | 0 793 569 | 5/2002 | ............. B29C 49/80 |
| JP | 58-195108 | 11/1983 | ............. G01B 11/26 |
| JP | 61-288109 | 12/1986 | ............. G01B 11/24 |
| WO | WO 99/28728 | 6/1999 | ............. G01N 21/00 |

OTHER PUBLICATIONS

German Search Report, dated Sep. 8, 2011 (6 pgs).
European Search Report, dated Jan. 12, 2011 (6 pgs).

* cited by examiner

*Primary Examiner* — Luke Ratcliffe
(74) *Attorney, Agent, or Firm* — Hayes Soloway P.C.

(57) ABSTRACT

Provided is an optical thread position detection device for detecting the rotational position of threads of containers. The thread position detection device comprises at least an optical detector and a positioning device for the defined orientation of a longitudinal axis of the containers relative to the detector, the positioning device and a defined coupling area of the container being connectable to one another. The optical detector, without coming into contact, registers items of information on at least one relative rotational position of at least one thread portion, the processor device serving to generate data on the rotational position of the container, incorporating a defined reference variable and the items of information.

21 Claims, 5 Drawing Sheets

OPTICAL THREAD POSITION DETECTION DEVICE

FIELD OF THE INVENTION

The present invention relates to an optical thread position detection device.

BACKGROUND OF THE INVENTION

For containers in which the neck (and thread position) must be situated in a specific position relative to the blown bottle shape, there are currently numerous mechanical and optical solutions, which have specific markings, such as an indentation or notch, on the parison (neck). An orientation of the parison or preform is necessary, especial for containers which are manufactured by the "preferential heating" process, in order that the desired temperature profile can be purposely applied on the parison body by means of a heat device, such as, for example, an infrared radiation source, a microwave, a laser, contact heat or the like.

In the mechanical solutions group, a wedge or the like is used for insertion in a notch (indentation, of the preform), thereby fixing this notch and the entire preform. The preform is thereby oriented before tempering the desired profile on to the preform, and with the parison correctly oriented, after screwing on, the closure is situated in the required position. With this solution, therefore, a marking in the form of an indentation, a notch or the like is always necessary on the parison.

With the optical solution, the notch is detected by means of a camera, photoelectric sensor or laser scanner and the preform is oriented by a stepping motor before the required temperature profile can be applied to the preform.

Both with the mechanical solution and with the optical solution, the change of type or change of mouth piece first and foremost involves an additional outlay. Sensors must be provided, which have to be adjusted and set up very precisely in relation to the mouth piece of the parison. This leads to a high, recurrent outlay. Although in the case of a camera system, that is to say in that of the aforementioned optical solution, a lower outlay is to be anticipated, since the necks and markings in the system are known, once the system has been used, there are, however, also limits to such a system. For example, a notch in the support ring can be detected only from below and an indentation on top of the support ring can be detected only from above. The camera would have to be swivelled, or two elements, i.e. two cameras, would have to be used, which carries with it additional costs.

Moreover the camera exposures take place on a reduction starwheel, thereby resulting in additional sources of error due to the transfers. In all the variants hitherto described, that is to say mechanical and optical detection, markings in the form of at least one recess or elevation are formed on the parison, which therefore call for special preforms, which are significantly more expensive to manufacture or procure than standard preforms.

The object of the present invention, therefore, is to create a simple, reliable and significantly more advantageous device, and a significantly more advantageous method, which serve for performing thread position detection of adequate quality.

SUMMARY OF THE INVENTION

According to the invention, the aforesaid object is achieved by an optical thread position detection device for detecting the position of threads of containers. This thread position detection device comprises at least an optical detector, a processor device and a positioning device for the defined orientation of a longitudinal axis of the containers relative to the detector, the positioning device and a defined coupling area of the container being connectable to one another. According to the invention, the optical detector (4a,b), without coming into contact, registers items of information on at least one relative rotational position of at least one thread portion (2a), the processor device serving to generate data on the rotational position of the container, incorporating a defined reference variable and the items of information. Items of information are taken to mean, in particular, items of imaging information, and data are taken to mean, in particular, processed, modified and supplemented items of imaging information and/or items of imaging information converted into another format.

It is furthermore feasible for the optical detector to detect a relative rotational position of at least one thread portion by detecting at least one defined reference position or for at least one thread portion to be formed in relation to at least one definitively oriented comparative portion.

The containers are more preferably bottles, but may also be canisters, cans and the like. The basic material of which the containers or parisons are composed is preferably a plastic and more preferably PET or PLA. The optical thread position is detected in order to allow the manufacture, in particular, of containers other than circular containers, such as other spherical and in particular oval containers, for example. In the case of non-circular containers it should be noted that the lid position relative to the container body may play a visual and/or functional role. If lid shapes matched to the shape of the container are used, for example, it is necessary for the shapes to complement one another, and therefore the fixing or closed position of the lid after screwing on to the thread or into the thread of the container is located in a position, which corresponds to the visually desired unit.

Advantages of the present invention over the invention disclosed by the prior art are, for example, the fact the present invention works with significantly more precision and is simpler, cheaper and more reliable, since, in particular, no mechanical contact and no use of special parisons is necessary. In addition, determination of the position without coming into contact means a considerable increase in the achievable machine performance.

In a further preferred embodiment of the present invention the reference point is a definitively oriented container portion (such as a support ring) and/or at least one defined marking formed in the beam path of the detector in the area of the positioning device. The reference point may consequently correspond to a fixed point and is therefore, at least at the instant of imaging or imaging information registration, always formed or arranged at the same location.

This embodiment is advantageous, since various comparative portions or reference points can be provided, so that changes can be made to the choice of comparative portions and reference points according to suitability, that is to say according to the number, configuration, speed, load-bearing capacity, temperature resistance, etc. of the detector and of the observed container.

In a further preferred embodiment of the present invention the definitively oriented container portion is the support ring and/or the neck area, in particular the neck edges extending in one plane. It is furthermore feasible for a further ring of the parison and/or other elevations or depressions moulded or formed on the container, or coloured markings or uncoloured markings, such as engravings, to serve as reference point, the elevations or depressions more preferably being integral parts of standard parisons. It is also possible, therefore, to detect the thread position when the parison is not arranged precisely in relation to the positioning device, that is to say the parison may be positioned with large tolerances relative to the positioning device. It is furthermore feasible for the reference point to be arranged or provided on a device situated at a distance from the parison, in particular in the area of the positioning device. This embodiment is advantageous, since an extremely small number of components is feasible, since apart from the detector, the positioning device and the parison further devices can preferably be dispensed with.

In a further preferred embodiment of the present invention the detector comprises an imaging device, the detector preferably being an imaging device. The imaging device is more preferably a camera, in particular a black-and-white camera, a colour camera or a camera set to register specific colours. In order to increase the throughput, the camera is more preferably a high-speed camera.

This embodiment is advantageous since the detector does not induce any mechanical stresses in the container and a high throughput rate is therefore achievable.

In a further preferred embodiment of the present invention a processor device is provided for evaluating the imaging information registered by the detector, in particular for determining the rotational position of the container, it also being feasible for the items of imaging information to be relayed to a processor device of a further fixture or a main control unit for controlling multiple fixtures arranged in series. It is equally feasible for a plurality of processor devices to be provided for accelerated evaluation, in particular processor devices of the same type.

This embodiment is advantageous since a statistical evaluation of the data is possible and/or an online monitoring of the thread position detection device is possible.

In a further preferred embodiment of the present invention the registered imaging information can be compared with the imaging information on a plurality of relative positions of the thread, stored in a means of storage.

This embodiment is advantageous since an extremely easy, reliable and rapid production change-over is possible, since preferably only software modifications need to be made.

In a further preferred embodiment of the present invention the detector comprises a laser device.

This embodiment is advantageous since a precise application of laser beams to the areas of the parison to be examined, in particular a thread portion of the parison, is possible.

This embodiment is advantageous since a laser beam can be emitted and evaluated extremely precisely and can be rapidly activated.

In a further preferred embodiment of the present invention the detector serves to detect markings in or on the container.

This embodiment is advantageous since coloured or engraved markings or laser-generated identification markings can be detected, for example, thereby also making it possible to use reference points, which are formed on the container and the position of which can be varied, in order to determine the required imaging information.

According to a further preferred embodiment of the present invention at least a second and/or a third detector, in particular a laser device, is provided for determining the reference variable.

This embodiment is advantageous since the further detector is able to detect the thread position even in the case of moving containers.

According to a further preferred embodiment an activation device, in particular a sensor, such as a scanner or an optical sensor, in particular a photoelectric light barrier, is provided for triggering the detector.

This embodiment is advantageous since the activation device serves for activating the detector at the optimum instant, so that unnecessary waiting times can be avoided and the throughput per hour can therefore be increased.

The present invention also relates to a method for optically detecting the position of threads of containers. The method comprises at least the steps involving orientation of a longitudinal axis of the containers relative to a positioning device, the positioning device and a defined coupling area of the container being connected to one another. According to the invention the relevant rotational position of at least one thread portion is detected in relation to at least one definitively oriented reference point. In the method it is also feasible, according to the invention, for the optical detector, without coming into contact, to register items of information on at least one relative rotational position of at least one thread portion, the processor device serving to generate data on the rotational position of the container, incorporating a defined reference variable and the items of information. Besides a reference point, two positional values of thread portions formed on the parison are preferably detected and the items of information on their position are relayed to the processor device for processing and the determination of positional data. The positional values preferably represent 0, 1, 2 or 3-dimensional components of the thread portions and are more preferably part(s) of planes, which extend at right-angles to the container longitudinal axis and which are separated by a distance from one another. The reference point likewise preferably extends in a plane at right-angles to the longitudinal axis of the containers and is separated by a distance from the planes of the positional values. The processor device preferably determines the thread position from the distance of a plane to the reference point, the processor device more preferably using both planes of the positional values and the distances of the planes of the positional values from one another and/or from the plane of the reference point in order to determine the data or the data representing the thread position. It is moreover feasible to register further positional values for each container and/or for the detector to detect further characteristics of the container, in particular the diameter, length, composition and/or thread type, or to relay these to the processor device.

BRIEF DESCRIPTION OF THE DRAWINGS

Further advantages, aims and characteristics of the present invention are explained in the following description of drawings attached, which represent examples of thread position detection devices. Components of the thread position detection device, which in the figures correspond at least substantially in terms of their function may here be identified with the same reference numerals, so that these components need not be numbered or explained in all figures.

In the drawings.

DETAILED DESCRIPTION OF THE INVENTION

Figure 1:
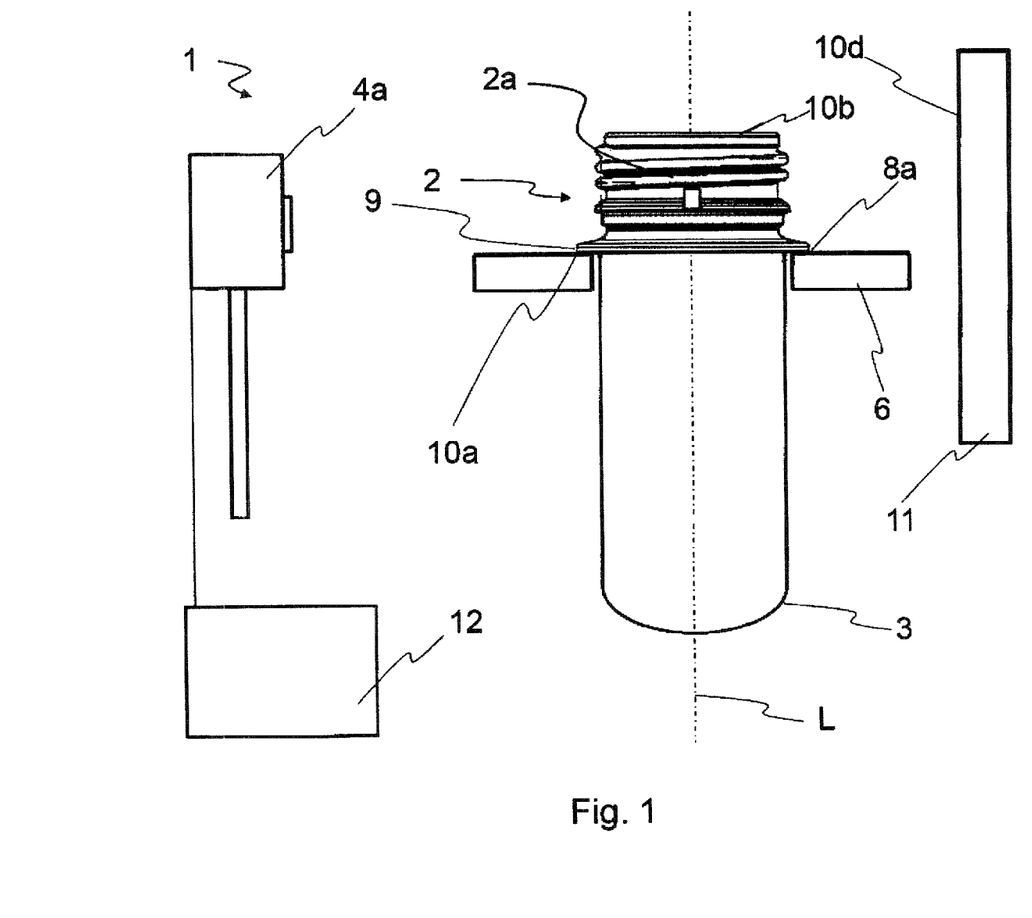
FIG. 1 shows a first schematic construction of the optical thread position detection device according to the present invention.

FIG. 1 shows an optical thread position detection device 1 according to the present invention. This optical thread position detection device 1 comprises a detector 4a for recording images or videos. The detector 4a is more preferably a camera device 4a, but may also comprise an illumination device for direct or indirect illumination of the parison 3, in particular the mouth area of the parison 3, it also being feasible to provide an illumination device in the area of the detector 4a, which more preferably illuminates the container mouth from substantially the same direction as that in which the imaging occurs. The illumination device could furthermore also be a flash device. The camera device 4a serves for registering images of the thread 2, in particular the thread portions 2a of the container 3. The images registered are preferably evaluated in a processor device 12.

The image or imaging information registration is preferably performed substantially or precisely at right-angles to the longitudinal axis L of the containers 3, it being also feasible for the image to be registered at an angle of 0°-90° to the longitudinal axis L of the containers 3.

According to the representation shown in FIG. 1, the container 3 is oriented or positioned by a positioning device 6, in particular a clamp 6. Here, in the representation shown in FIG. 1, the container 3 is connected to the positioning device 6 by a coupling area 8a. The container 3 in such an arrangement more preferably rests with the support ring 9 on the positioning device 6.

Various possible reference points are identified by the reference numerals 10a, 10b and 10d. The reference point 10a represents the support ring, for example, the reference point 10b represents the mouth edge of the container 3, for example, and the reference numeral 10d preferably serves to identify a reference point on a background 11 or on some other wall device. The element identified by the reference numeral 11 may be a background, for example, or also an illumination device, a mirror device, a further imaging device or the like. It is furthermore feasible to omit the device 11. The reference points 10a, 10b, 10d are more preferably independent of the rotational position of the containers 3.

Figure 2:
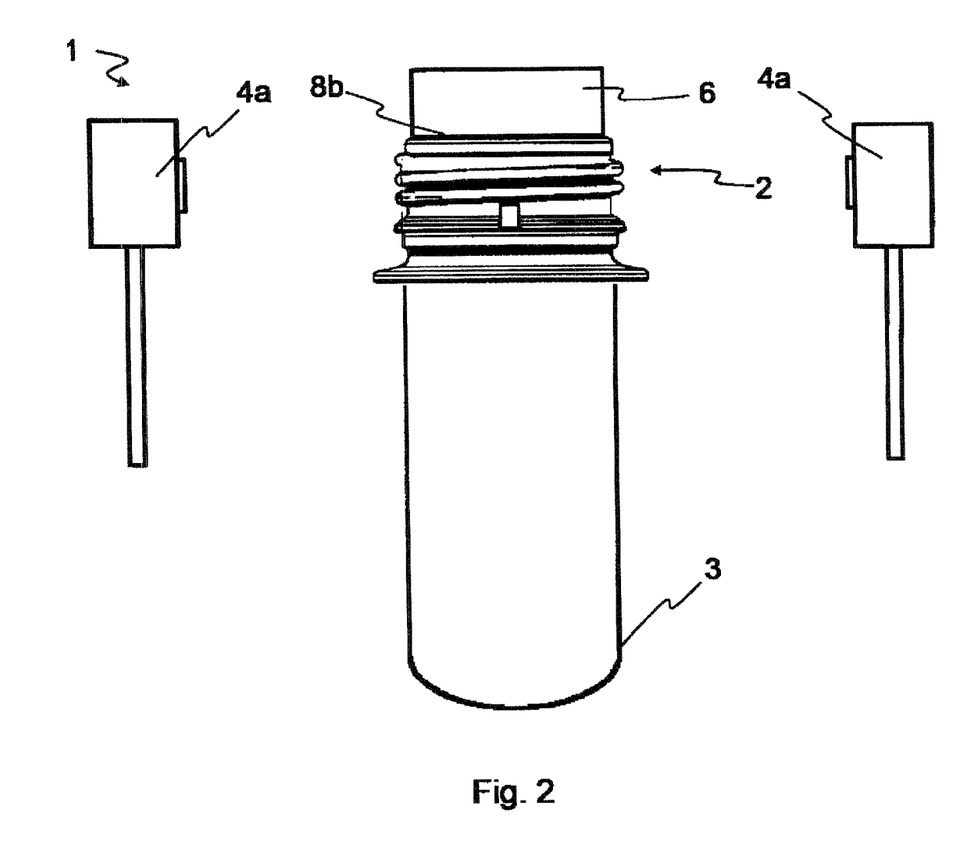
FIG. 2 shows a second schematic construction of the optical thread position detection device according to the present invention.

FIG. 2 represents two optical detectors 4a, which detect the container 3 from two different directions. It can further be seen from FIG. 2, in contrast to FIG. 1, that the positioning device 6 engages in the container 3 and the container 3 therefore does not rest with the support ring 9 on the positioning device 6, a fixing or positioning instead ensuing due to the positioning device 6 being clamped to the wall of the container 3.

Figure 3:
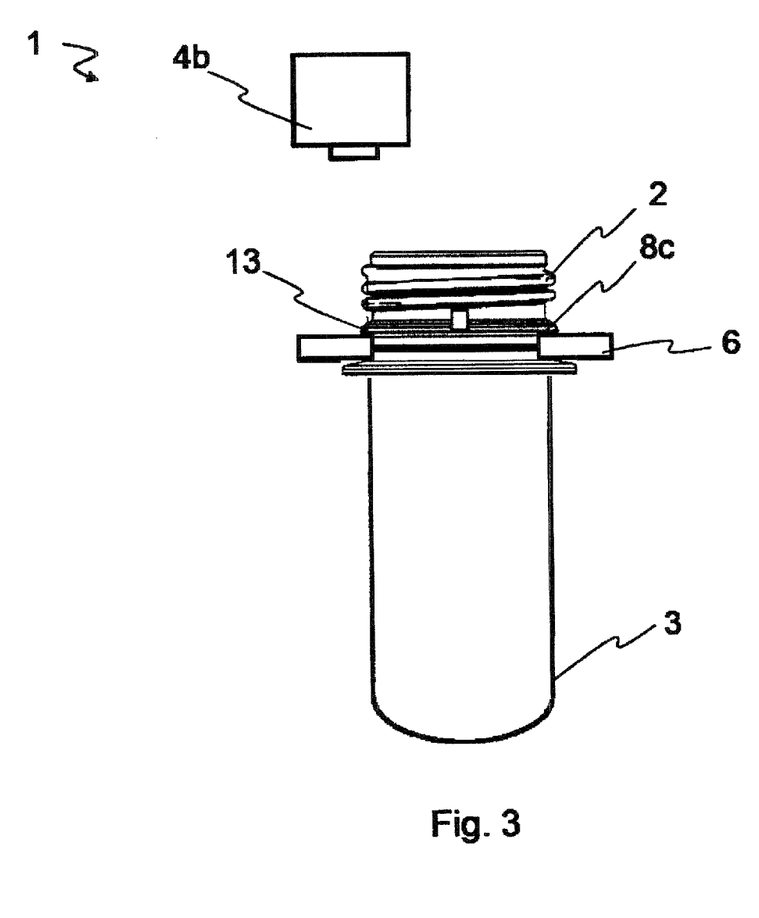
FIG. 3 shows a third schematic construction of the optical thread position detection device according to the present invention.

FIG. 3 represents the positioning device 6 above the support ring and below a further ring. However, the positioning devices 6 shown in the individual figures may also be interchangeable. Here the further ring 13 and the positioning device 6 can also be positively and/or frictionally coupled, for example by way of a coupling area 8c. In contrast to the embodiments in FIGS. 1, 2 and 4, the optical detector 4b is arranged in a longitudinal direction over or above the thread 2. It is also feasible, however, for the detector 4b to be arranged inclined at an angle of up to 90° to the longitudinal axis of the container, particularly in the plane of representation.

Figure 4:
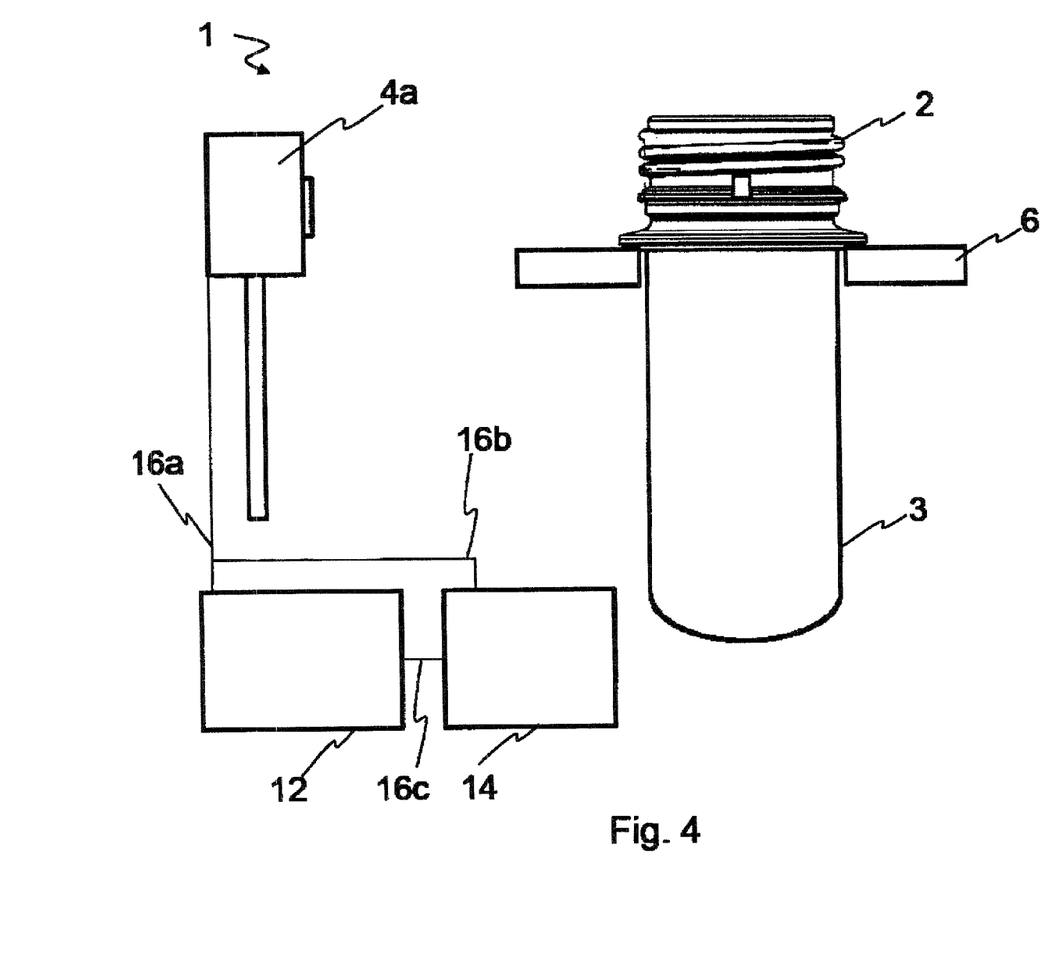
FIG. 4 shows a fourth schematic construction of the optical thread position detection device according to the present invention.

FIG. 4 represents substantially the same construction as in FIG. 1, this representation likewise showing the storage device identified by the reference numeral 14.

The storage device 14 serves to provide a multiplicity of imaging information, which according to an especially preferred embodiment can be matched to the items of imaging information registered by the detector 4a for detecting the alignment or orientation of the parison 3.

Thus it is possible, for example, to undertake a detection of the alignment or orientation, accurate to approximately 1°, using 360 images or items of imaging information stored in the storage device 14 and each corresponding to an exposure of the position of a parison 3 offset by approximately 1°, the images or items of imaging information including at least data on the neck and/or mouth piece or in each case an image of the neck and/or data on the current position and camera position at the time of the exposure. It is also feasible to increase the accuracy to 0.5° through interpolation or attribution of registered images or items of imaging information differing from the held or stored images or items of imaging information. It is feasible here, for example, to store precisely 360 images in the storage device 14, or to store a multiple of the number of images, in particular an integral multiple, such as, for example, 720, 1080, 1420 etc images or items of imaging information.

It is furthermore feasible to store fewer images or items of imaging information, such as 90, 180 or 270 images or items of imaging information in the storage device 14. This is therefore equivalent to the comparison of data stored in an image pool. That is to say, the thread position detection device, in particular the processor device 12 of the thread position detection device, preferably compares each exposure or multiple exposures with the stored images in the pool and in each case compares the stored image or the stored items of imaging information and the exposed image or the recorded items of imaging information. The storage image or the stored items of imaging information with the highest correlation here indicate the position of the thread or representative of the thread position detection device are defined as the position of the thread for at least one ensuing processing stage.

Data connections are identified by the reference numerals 16a, 16b and 16c. It is feasible here for the data connections 16a-16c to be embodied as cables and/or wireless connections. It is furthermore feasible, for example, to omit one of the connections 16b or 16c or for the processor device 12 and the storage device 14 to be embodied as a processor-storage device.

Figure 5:
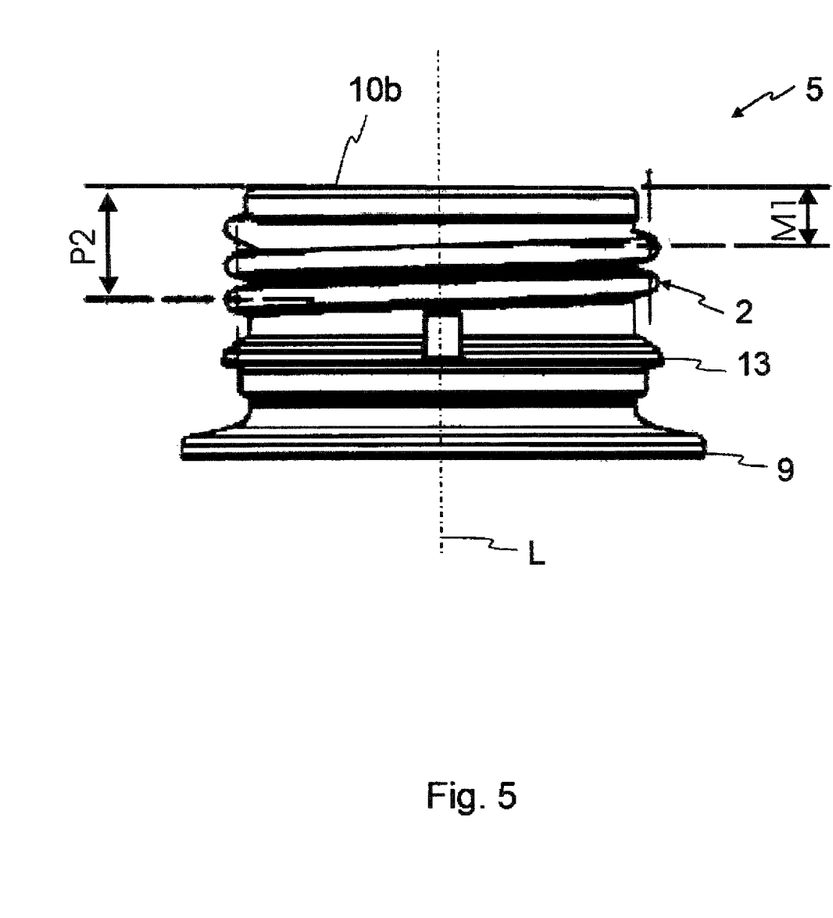
FIG. 5 shows a two-dimensional view of a neck or threaded piece of a parison.

FIG. 5 represents a mouth piece 5 with a thread 2 of a container (not shown). With the detector (not shown) the optical thread position detection device according to the present invention takes an exposure of the neck 5. According to a further especially preferred embodiment, the thread position detection device, from a reference point (for example the upper edge of the neck) measures the points of intersection M1 and P2; from the position of the reference points the thread position detection device is able to calculate how the position of the thread lies in the exposure. Thus the parison or the neck 5 of the parison can be brought into the correct or required position. Data on the thread contour, in particular the lead, pitch, flank profile, major diameter, and/or root diameter, the thread position detection device, in particular the processor device 12 (not shown) are preferably predeterminable, or the processor device 12 is able to derive such data from the image or items of imaging information.

It is furthermore feasible, also in two stages, to use existing indentations for preliminary orientation and the thread contour for fine orientation.

In addition, it is possible to infer the rotational position of the parison from multiple indentations/markings, which may be sited at various heights beneath the thread. This is necessary if, in the case of a multipart thread, for example, the position cannot be determined from the thread contour at a reference point. Ideally, four markings offset by approximately 90° and preferably by exactly 90° should be applied here, so that the complete rotational position can be determined by means of one camera exposure.

This method would be feasible preferably using ventilation slits already present in the thread.

It is furthermore feasible for the thread 2 to be spaced at a distance from the neck edge in the direction L and/or to be spaced at a distance from the support ring 9 in the direction L.

According to the present invention indentations, notches or similar marking points are therefore superfluous. In particular, it is possible to dispense with notches on the support ring, which cause problems for example in sealing the blow nozzle.

The applicant reserves the right to claim all features disclosed in the application documents as essential for the invention, insofar as, individually or in combination, they are novel compared to the prior art.

List of Reference Numaerals 1 thread position detection device
2 thread
2a thread portions
3 container
4a, 4b optical detector
5 mouth piece
6 positioning device, clamp
8a, 8c coupling area
9 support ring
10a,b,d reference points
11 element
12 processor device
13 further ring
14 storage device

The invention claimed is:

1. An optical thread position detection device for detecting the rotational position of threads of plastic performs in relation to a longitudinal axis of the container, comprising
    an optical detector, a processor device and a positioning device for the defined orientation of a longitudinal axis of the containers relative to the detector the positioning device and a defined coupling area of the container being connectable to one another,
wherein
    the optical detector, without coming into contact, registers items of information on at least one relative rotational position of at least one thread portion, the processor device serving to generate data on the rotational position of the plastic perform, incorporating a defined reference variable and the items of information, wherein the defined reference variable corresponds to a reference point, which is a definitively oriented plastic perform portion and/or at least one defined marking formed in the beam path of the detector in the area of the positioning device.

2. The optical thread position detection device according to claim 1, wherein the definitively oriented container portion is the support ring.

3. An optical thread portion detection device according to claim 2, wherein the definitively oriented container portion is the mouth edge extending in one plane.

4. The optical thread position detection device according to claim 1, wherein the detector comprises an imaging device for registering the items of information.

5. The optical thread position detection device according to claim 4, wherein the registered items of information are items of imaging information and can be compared with items of imaging information, which are provided in a storage device and which represent a plurality of relative positions of the thread.

6. The optical thread position detection device according to claim 1, wherein the detector comprises a laser device.

7. The optical thread position detection device according to claim 6, wherein the laser device serves to emit a laser beam towards at least one thread portion for determining the position of the container.

8. The optical thread position detection device according to claim 7, wherein at least a second laser device is provided for determining the reference variable.

9. The optical thread position detection device according to claim 1, wherein an activation device is provided for triggering the detector.

10. An optical thread position detection device according to claim 1, wherein beside the reference point two positional values of the thread portions formed in the perform are detected.

11. An optical thread position detection device according to claim 10, wherein the position values are separated by a distance from each other.

12. An optical thread position detection device according to claim 10, wherein the positional values represent 0,1,2, or 3 dimensional components of the thread portions.

13. An optical thread position detection device according to claim 1 wherein a processor device determines the thread position from a plane to the reference point.

14. An optical thread position detection device according to claim 1 wherein the positioning device comprises a clamp.

15. An optical thread position detection device according to claim 1, wherein the reference points are independent of the rotational position of the preforms.

16. An optical thread position detection device according to claim 1, wherein the device comprises an illumination device for direct illumination of the mouth area of the preform.

17. An optical thread position detection device according to claim 16, wherein the illumination device illuminates the preform from substantially the same direction as that in which the imaging occurs.

18. A method for optically detecting the position of threads of plastic performs, comprising at least the following steps:
    orientation of a longitudinal axis of the plastic performs relative to a positioning device, the positioning device and a defined coupling area of the plastic perform being connected to one another,
    wherein the method comprises the detection of the relevant rotational position of at least one thread portion relative to at least one definitively oriented reference point.

19. The method according to claim 18, wherein the thread position is detected in order to allow the manufacture of containers other than circular containers.

20. The method according to claim 18, wherein beside the reference point two positional values of the thread portions formed in the preform are detected.

21. The method according to claim 18, wherein the position values are separated by a distance from each other.

* * * * *

UNITED STATES PATENT AND TRADEMARK OFFICE
CERTIFICATE OF CORRECTION

PATENT NO.         : 8,665,426 B2                                                    Page 1 of 1
APPLICATION NO.    : 13/269376
DATED              : March 4, 2014
INVENTOR(S)        : Huettner et al.

It is certified that error appears in the above-identified patent and that said Letters Patent is hereby corrected as shown below:

On the Title Page: Item (57)

Abstract, lines 5-6, "detector ,the" should be --detector, the--.

Abstract, line 8, "detector ," should be --detector,--.

In the Claims:

Claim 1, Col. 7, line 44, "the detector the positioning" should be --the detector, the positioning--.

Claim 1, Col. 7, line 52, "perform" should be --preform--.

Claim 1, Col. 7, line 55, "perform" should be --preform--.

Claim 12, Col. 8, line 30, "3 dimensional" should be --3-dimensional--.

Signed and Sealed this
Sixteenth Day of September, 2014

Michelle K. Lee
*Deputy Director of the United States Patent and Trademark Office*